United States Patent
Wilkinson

[11] 3,768,012
[45] Oct. 23, 1973

[54] POWER SUPPLY CURRENT DETECTOR SYSTEM

[75] Inventor: Bruce L. Wilkinson, Torrance, Calif.

[73] Assignee: Pioneer Magnetics, Inc., Santa Monica, Calif.

[22] Filed: May 8, 1972

[21] Appl. No.: 251,251

[52] U.S. Cl. .................................... 324/127, 323/9
[51] Int. Cl. ............................................. G01r 19/16
[58] Field of Search ............... 324/127, 128; 323/9; 317/27 R; 321/10

[56] References Cited
UNITED STATES PATENTS
3,028,539   4/1962   Wright............................ 324/127 X
3,427,534   2/1969   Maxwell.......................... 324/127 X OTHER PUBLICATIONS
J. G. Graeme, G. E. Tobey, L. P. Huelsman, Operational Amplifiers Design and Application, McGraw-Hill Book Co., New York, 1971, pg. 208.

Primary Examiner—Rudolph V. Rolinec
Assistant Examiner—Rolf Hille
Attorney—Keith D. Beecher

[57] ABSTRACT

A power supply current detector system is provided which includes the filter choke inductor of the power supply, and which uses the winding resistance of the filter choke as a current sensor. The system of the invention produces an output which is indicative of the power supply output current, and which can be used for overload detection, and other purposes.

5 Claims, 1 Drawing Figure

PATENTED OCT 23 1973 3,768,012
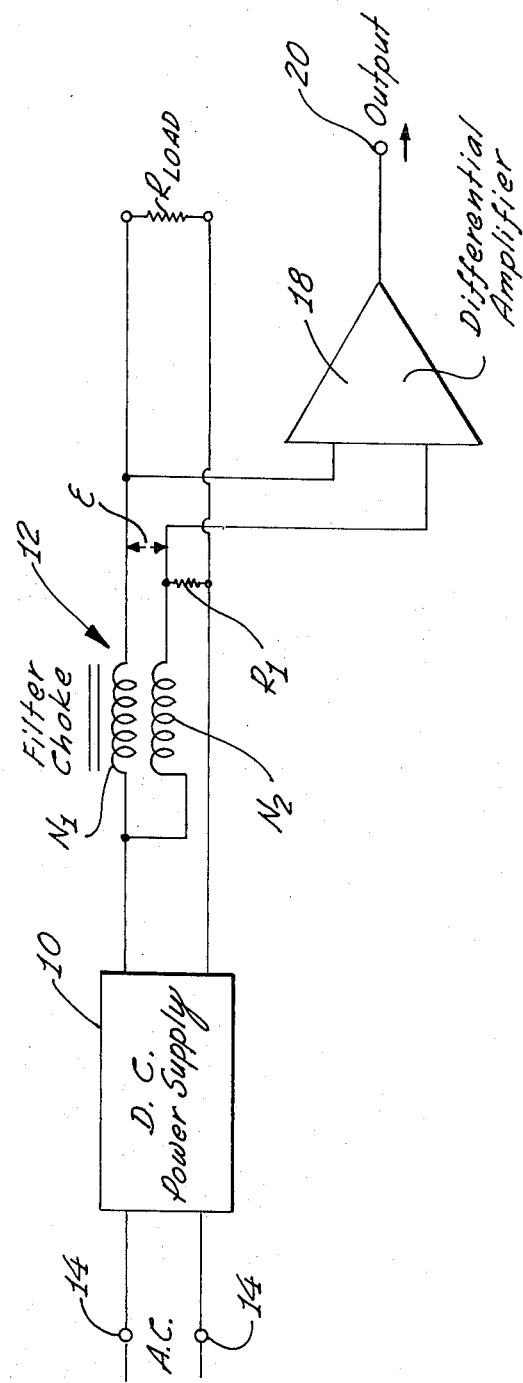

POWER SUPPLY CURRENT DETECTOR SYSTEM

BACKGROUND OF THE INVENTION

The sensing of the output current of high level direct current power supplies has presented significant design problems in the prior art. For example, in a 50 ampere direct current power supply, one milliohm of resistance will dissipate 2.5 watts and produce a signal of 50 millivolts. Since such low value resistors are not readily available, the prior art systems usually include several resistors in parallel, or meter shunts, or some form of magnetic sensing, in the design of appropriate output current detectors for high current power supplies. As a result, the prior art detector systems are costly, and with the exception of the magnetic sensing system, dissipate substantial power. Such power dissipation reduces the overall efficiency of the power supply in which the prior art current detectors are incorporated.

In various types of switching regulated power supplies, such as the phase controlled, pulse width modulator, series chopper controlled types, and the like, the output filter of the power supply usually includes a filter choke inductor. The detector system of the present invention is applicable to such type of power supplies in which a filter choke inductor is included in its filter circuit. The detector of the invention uses the winding resistance of the filter choke to sense the direct current output. This means that current sensing is achieved in the detector system of the invention, without the requirement of any additional resistance elements, as is the case with most of the prior art detectors referred to above.

However, when using the resistance of the choke coil for current sensing, certain problems arise. For example, the alternating current voltage developed across the inductance of the choke must be rejected, and the temperature drift of the choke winding resistance must be compensated. Both these problems are overcome by the circuit and system of the present invention.

BRIEF DESCRIPTION OF THE DRAWING

The single FIGURE is a schematic representation of a direct current power supply having a choke coil in its output filter circuit, and of an output current detector system connected to, and incorporating, the choke coil, and embodying the concepts of the present invention.

DETAILED DESCRIPTION OF THE ILLUSTRATED EMBODIMENT

In the drawing, a direct current power supply is represented by the block 10, and is of the type which incorporates a filter choke coil 12 in its output filter circuit. The power supply 10 responds to an alternating current voltage applied to its input terminals 14 to develop an unfiltered direct current voltage across its output terminals. The unfiltered direct current voltage from the power supply 10 is filtered by the filter choke 12, so that a filtered direct current voltage is applied to the load which is designated $R_{load}$.

The filter choke 12 has two windings designated $N_1$ and $N_2$. The winding $N_1$ is in series with one lead of the power supply circuit. One side of the winding $N_2$ is connected to the winding $N_1$, and the other side is connected to a differential amplifier 18. The other input terminal of the differential amplifier 18 is connected to the aforesaid lead of the power supply. A resistor $R_1$ connects the other input terminal of the differential amplifier to the other lead of the power supply. A signal having an amplitude corresponding to the output load current of the amplifier is developed at the output terminal 20 of the differential amplifier.

If the windings $N_1$ and $N_2$ of the filter choke 12 are of an equal number of turns, the voltage E between the windings is independent of the alternating current inductive voltage developed across the choke. This is because the transformer action between the windings $N_1$ and $N_2$ cancels out the inductive voltage. However, the transformer action of the windings has no effect on the resistive drops of the windings $N_1$ and $N_2$.

Therefore, if the resistance of the winding $N_1$ is $Rn_1$, and if the resistance of the winding $N_2$ is $Rn_2$, the voltage E is zero when the following condition is met:

$$Rn_1/Rn_2 = R_{load}/R_1 \qquad 1$$

The differential amplifier 18 is a sensitive amplifier, and is used as a differential comparator to detect the zero voltage condition, so that a control function such as current limiting can be implemented by selecting the value of $R_1$ to produce zero output from the differential amplifier for a particular load.

As can be seen, the value of the load ($R_{load}$) at which the current limit will take place is given by the relationship:

$$R_{load} = R_1 \cdot Rn_1/Rn_2 \qquad 2$$

Therefore, if the resistor $R_1$ is a stable resistor, and if the ratio $Rn_1/Rn_2$ is stable, the value of the load ($R_{load}$) and, therefore, of the current limit point is stable.

For the aforesaid purpose, the resistance of resistor $R_1$ is in a range of values, such as, for example, 10–100,000 ohms, so as to be a readily available commercial item, and one which is also commercially available as a stable component. Moreover, since the windings $N_1$ and $N_2$ are wound on the same coil, the temperature of each winding will be essentially the same. Therefore, if both windings are wound with materials having equal temperature coefficients of resistance, the ratio $Rn_1/Rn_2$ will be stable in spite of temperature variations. To achieve the equal temperature coefficients for both windings, they may either be wound with the same type of materials, such as copper or aluminum, or they may even be wound of different types of materials, so long as they have essentially the same temperature coefficients.

Because it is desirable to minimize the power dissipation in the resistor $R_1$, the value of the resistor $R_1$ is generally of the order of 100–10,000 times the value of $R_{load}$. Therefore, the ratio $Rn_1/Rn_2$ must be of the order of 1/100 to 1/10,000. This means that the resistance $Rn_2$ must be 100–10,000 times the resistance $Rn_1$. This can be accomplished by winding the windings in $N_1$ and $N_2$ with the same material, but with different wire gages, or by using a higher resistivity wire in the winding $N_2$, but which is the same temperature coefficient as a lower resistivity wire used in the winding $N_1$.

The invention provides, therefore, a simple circuit for detecting the output current of a high current direct current power supply, and of achieving the detection with a minimum of components, and with a minimum of power dissipation. As mentioned above, the output of the differential amplifier may be used for overload detection, or for other purposes.

Although a particular embodiment of the invention has been shown and described, modifications may be made, and it is intended in the claims to cover all modifications which come within the spirit and scope of the invention.

What is claimed is:

1. In combination with a power supply for producing a direct current output current having a first lead and a second lead extending to a pair of output terminals across which a load is connected, and further having a filter circuit for filtering the current including an inductor choke having a first winding series connected with said first lead and having a second winding with one side connected to one side of said first winding and inductively coupled to said first winding; resistance means connecting the other side of said second winding to said second lead; and differential comparator means connected to the other side of said first winding and to the other side of said second winding for providing an output corresponding to said direct current output current.

2. The combination defined in claim 1, in which said first and second windings are wound as a common coil.

3. The combination defined in claim 1, in which said first and second windings are wound with materials having essentially the same temperature coefficients of resistance.

4. The combination defined in claim 1, in which the value of said resistance means is of the order of 100–10,000 times the value of the resistance of said load.

5. The combination defined in claim 4, in which the resistance of said second winding is of the order of 100–10,000 times the resistance of said first winding.

* * * * *